(12) United States Patent
Redko et al.

(10) Patent No.: US 12,202,852 B2
(45) Date of Patent: Jan. 21, 2025

(54) LIGNIN EXTRACTION WITH VOLATILE TRIALKYLAMINES

(71) Applicant: BOARD OF TRUSTEES OF MICHIGAN STATE UNIVERSITY, East Lansing, MI (US)

(72) Inventors: Mikhail Redko, Ann Arbor, MI (US); James E. Jackson, Haslett, MI (US); Christopher M. Saffron, Okemos, MI (US); Leo Lacivita, Portland, OR (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 848 days.

(21) Appl. No.: 17/296,605

(22) PCT Filed: Nov. 26, 2019

(86) PCT No.: PCT/US2019/063139
§ 371 (c)(1),
(2) Date: May 25, 2021

(87) PCT Pub. No.: WO2020/112702
PCT Pub. Date: Jun. 4, 2020

(65) Prior Publication Data
US 2022/0002330 A1    Jan. 6, 2022

Related U.S. Application Data

(60) Provisional application No. 62/771,331, filed on Nov. 26, 2018.

(51) Int. Cl.
*C07G 1/00*    (2011.01)
*A23K 20/163*    (2016.01)
(Continued)

(52) U.S. Cl.
CPC .............. *C07G 1/00* (2013.01); *A23K 20/163* (2016.05); *C08B 1/00* (2013.01); *C08H 8/00* (2013.01)

(58) Field of Classification Search
CPC .......... C07G 1/00; A23K 20/163; C08B 1/00; C08H 8/00
(Continued)

(56) References Cited

U.S. PATENT DOCUMENTS 3,244,761 A    4/1966    McKinnis
4,597,830 A    7/1986    April et al.
(Continued)

FOREIGN PATENT DOCUMENTS

CN    102877350 A    1/2013
WO    WO-2006/037461 A2    4/2006
WO    WO-2016/197233 A1    12/2016

OTHER PUBLICATIONS

Gschwend et al., "Pretreatment of Lignocellulosic Biomass with Low-cost Ionic Liquids", J. Vis. Exp., (114):e54246 (2016).
(Continued)

*Primary Examiner* — David T Karst
(74) *Attorney, Agent, or Firm* — MARSHALL, GERSTEIN & BORUN LLP

(57) ABSTRACT

The disclosure relates to methods for extracting lignin from lignocellulosic biomass using volatile trialkylamines. A lignocellulosic biomass is combined with an aqueous extraction solution including the trialkylamine and water to provide a biomass extraction mixture that can at least partially extract lignin from the lignocellulosic biomass. The method further includes removing the trialkylamine from the biomass extraction mixture. The method further relates to the utilization of the resulting materials. For example, the lignin extract can be used to make carbon fibers, carbon-carbon
(Continued)

materials, or polyamines. The delignified biomass can be used as feed for animals, fungi and/or bacteria. Also, the cellulosic or carbohydrate components of the delignified biomass can be hydrolyzed into pentoses and/or hexoses, which can be used as a feed or starting material for the subsequent conversion into other products. Acetic acid, removed from the biomass in form of trialkylammonium acetate, can be recovered from the mixture for further use or conversion into other chemicals.

29 Claims, 2 Drawing Sheets

(51) Int. Cl.
  C08B 1/00 (2006.01)
  C08H 3/00 (2006.01)
  C08H 8/00 (2010.01)
(58) Field of Classification Search
  USPC .......................................................... 530/500
  See application file for complete search history.

(56) References Cited

U.S. PATENT DOCUMENTS

| | | |
|---|---|---|
| 5,662,802 A | 9/1997 | Heins et al. |
| 5,705,618 A | 1/1998 | Westcott et al. |
| 8,216,809 B2 | 7/2012 | Diner et al. |
| 8,241,873 B2 | 8/2012 | Diner et al. |
| 8,278,070 B2 | 10/2012 | Diner et al. |
| 9,493,851 B2 | 11/2016 | Jansen et al. |
| 9,650,657 B2 | 5/2017 | Chundawat et al. |
| 2007/0219141 A1 | 9/2007 | Jones et al. |
| 2010/0159516 A1* | 6/2010 | Diner ....................... D21C 3/20 536/128 |
| 2012/0264173 A1 | 10/2012 | Diner et al. |
| 2016/0002358 A1 | 1/2016 | Teixeira et al. |
| 2017/0226330 A1* | 8/2017 | Knudsen ................... C08L 5/14 |
| 2017/0241076 A1 | 8/2017 | Denchokpraguy et al. |

OTHER PUBLICATIONS

International Application No. PCT/US19/63139, International Search Report and Written Opinion, mailed Feb. 18, 2020.

Peter et al., "Degradation of lignin with monomethylamine", Chem. Eng. Technol., 15:213-7 (1992).

Wang et al., "Comparative Characterization of Degraded Lignin Polymer from the Organosolv Fractionation Process with Various Catalysts and Alcohols", J. Appl. Polym. Sci., 8 pp. (2014).

Wongsiriwan et al., "Lignocellulosic Biomass Conversion by Sequential Combination of Organic Acid and Base Treatments", Energy Fuels, 24:3232-8 (2010).

* cited by examiner

LIGNIN EXTRACTION WITH VOLATILE TRIALKYLAMINES

CROSS-REFERENCE TO RELATED APPLICATIONS

This is a National Stage of International Application No. PCT/US19/63139, filed Nov. 26, 2019 (incorporated herein by reference in its entirety), which claims priority to U.S. Provisional Application No. 62/771,331 (filed Nov. 26, 2018), each of which is incorporated herein by reference in its entirety.

STATEMENT OF GOVERNMENT INTEREST

None.

BACKGROUND OF THE DISCLOSURE

Field of the Disclosure

The disclosure relates to methods for extracting lignin from lignocellulosic biomass using volatile trialkylamines. A lignocellulosic biomass is combined with an aqueous extraction solution including the trialkylamine and water to provide a biomass extraction mixture that can at least partially extract lignin from the lignocellulosic biomass. The methods further include removing the trialkylamine from the biomass extraction mixture.

SUMMARY

In one aspect, the disclosure provides a method of extracting lignin from a lignocellulosic biomass, the method comprising: admixing a lignocellulosic biomass with an aqueous extraction solution comprising water and a trialkylamine under temperature and pressure sufficient to extract lignin (e.g., depolymerize and/or solubilize lignin) from the lignocellulosic biomass, thereby providing a biomass extraction mixture comprising the water, the trialkylamine, and the lignin (e.g., with the lignin solubilized in the water/trialkylamine solution of the extraction mixture); and removing the trialkylamine from the biomass extraction mixture, thereby forming a solubilized lignin extract; wherein the trialkylamine has a structure of formula (I) and is present in the aqueous extraction solution in an amount ranging from about 1 wt % to about 80 wt % or about 20 wt % to about 80 wt %, based on the total weight of the aqueous extraction solution:

(I)

wherein each of $R^1$, $R^2$, and $R^3$ is independently $C_{1-6}$ alkyl.

In a more particular aspect, the disclosure provides a method of extracting lignin from a lignocellulosic biomass, the method comprising: admixing a lignocellulosic biomass with an aqueous extraction solution comprising water and a trialkylamine at a temperature ranging from about 100° C. to about 200° C. and a pressure sufficient to extract lignin from the lignocellulosic biomass, thereby providing a biomass extraction mixture comprising the water, the trialkylamine, and the lignin solubilized therein, and removing the trialkylamine from the biomass extraction mixture, thereby forming a solubilized lignin extract, wherein the aqueous extraction solution comprises: from about 20 wt % to about 80 wt % or 99 wt % water, and from about 1 wt % or 20 wt % to about 80 wt % trialkylamine, wherein the trialkylamine is selected from the group consisting of trimethylamine, triethylamine, tripropylamine, dimethylethylamine, and any combination thereof.

The amount of the trialkylamine in the aqueous extraction solution is not particularly limited. In some embodiments, the aqueous extraction solution includes from about 1 wt % to about 80 wt % trialkylamine, based on the total weight of the aqueous extraction solution. In some embodiments, the aqueous extraction solution includes from about 20 wt % to about 80 wt % trialkylamine, based on the total weight of the aqueous extraction solution. For example, the aqueous extraction solution can comprise at least about 1, 5, 10, 20, 30, 40, 50, or 60 wt % and/or up to about 10, 20, 30 40, 50, 60, 70 or 80 wt % trialkylamine, based on the total weight of the aqueous extraction solution. Furthermore, the trialkylamine can have a structure of formula (I), wherein $R^1$, $R^2$, and $R^3$ are each independently selected from methyl, ethyl, propyl, isopropyl, butyl, isobutyl, sec-butyl, tert-butyl, pentyl, any isomer of pentyl, hexyl, or any isomer of hexyl. Each of $R^1$, $R^2$, and $R^3$ can be the same or different relative to each other. For example, in embodiments, each of $R^1$, $R^2$, and $R^3$ can be methyl such that the trialkylamine is trimethylamine. In embodiments, two of $R^1$, $R^2$, and $R^3$ can be methyl, and one can be ethyl, such that the trialkylamine is dimethylethylamine.

Various refinements of the disclosed methods for extracting lignin from a lignocellulosic biomass are possible.

In a refinement, removing the trialkylamine from the biomass extraction mixture includes performing one or more of solvent evaporation and distillation. The trialkylamine can be removed through solvent evaporation and distillation under conditions which are within the purview of the person of ordinary skill in the art. The trialkylamine can be removed and recycled to be used, for example, in subsequent lignin extractions according to the methods described herein.

In a refinement, the trialkylamine has a structure of formula (I) wherein each of $R^1$, $R^2$, and $R^3$ is independently methyl, ethyl, propyl, or isopropyl. In a refinement, the trialkylamine is selected from the group consisting of trimethylamine, triethylamine, dimethylethylamine, tripropylamine, and combinations thereof. In some embodiments, only a single trialkylamine is used in the process as the extraction solvent, which simplifies subsequent separation, recovery, and recycling of the extraction solvent.

In a refinement, the aqueous extraction solution includes from about 20 wt % to about 99 wt % water or about 20 wt % to about 80 wt % water, based on the total weight of the aqueous extraction solution. For example, the aqueous extraction solution can include from about 20, 30, 40, 50, or 60 wt % and/or up to about 40, 50, 60, 70 or 80, 90, 95, 98, 99 wt % water, based on the total weight of the aqueous extraction solution.

In a refinement, the aqueous extraction solution comprises the trialkylamine and the water in a total amount of at least about 75 wt %, based on the total weight of the aqueous extraction solution. For example, the aqueous extraction solution can include at least about 75, 80, 85, 90, 95, 98, or 99 wt % and/or up to about 80, 85, 90, 95, or 100 wt % water and trialkylamine(s), based on the total weight of the aqueous extraction solution. The aqueous extraction solution and/or biomass extraction mixture can further include acetic acid, peptides, amino acids, inorganic compounds, low molecular weight lignin decomposition products, lipids, and other extracts from the lignocellulosic biomass. In some cases, the biomass extraction mixture includes acetic acid, which can be present as deprotonated acetic acid, or in a complex with the trialkylamine (e.g., as a trialkylammonium acetate). The acetic acid can be independently separated and purified from the biomass extraction mixture, and thereafter converted into other products, such as acetone.

In a refinement, the method comprises performing the admixing at a temperature in a range from about 100° C. to about 200° C. For example, the admixing can be performed at a temperature of at least about 100° C., 125° C., or 150° C. and/or up to 150° C., 175° C., or 200° C. In embodiments, the method comprises performing the admixing at a temperature of at least about 130° C. While lignin depolymerization can occur at temperatures of about 100° C., the reaction proceeds at a slower rate, lengthening the time of the reaction. In some embodiments, the method comprises performing the admixing at a temperature ranging from about 130° C. to about 160° C. Temperatures in this range generally allow the lignin depolymerization to occur within a few hours.

In refinements, the method comprises performing the admixing in a pressurized vessel, for example to effect lignin extraction in the vessel. In general, the pressure under which the admixing is performed has to be sufficient to prevent boiling and evaporation of the aqueous extraction solution. The pressure in the pressurized vessel can be at a sum of the vapor pressure of the water, the pressure of air or other gas filling the reactor space above the liquids and biomass, and the vapor pressure of trialkylamine. The vapor pressure of the trialkylamine will depend on the molecular weight and concentration of the particular trialkylamine used in the aqueous extraction solution. For example, high concentrations of trialkylamines having a low molecular weight (e.g. trimethylamines) result in higher vapor pressure.

In refinements, the method comprises performing the admixing for any period of time sufficient to extract lignin from the lignocellulosic biomass. The method can comprise performing the admixing for a period of time up to about 20 hours. For example, the method can comprise performing the admixing for at least about 10 mins, 20 mins, 30 mins, 45 mins, 1 hr, 2 hr, 5 hr, 8 hr, or 10 hr and/or up to about 1 hr, 2 hr, 5 hr, 8 hr 10 hr, 12 hr, 15 hr, 18 hr, or 20 hr. The period of time necessary to perform the extraction is dependent on the pressure, temperature, and manufacturing equipment used. For example, using industrial-scale equipment, the extraction may be completed in a shorter period of time than it would be if using lab-scale equipment. The period of time of the reaction suitably is sufficiently long to ensure that the reaction homogeneously and efficiently thermalizes. Performing the reaction too quickly may require an increased temperature that can undesirably decompose other biomass components, such as cellulose or hemicellulose. Furthermore, high temperatures can lead to high vapor pressure and high equipment cost.

In refinements, the lignin is present in the lignin extract in an amount ranging from about 20 wt % to about 60 wt %, based on the total weight of the lignin extract. For example, the lignin is present in the lignin extract at an amount ranging from at least about 20, 30, 40, or 50 wt % and/or up to about 30, 40, 50, or 60 wt % based on the total weight of the lignin extract. Precipitates with higher lignin content may be obtained by selective lignin precipitation from the lignin extract by the addition of acids (such as acetic acid) or by amine evaporation. In these cases, the other extracted components will remain in the lignin extract, while lignin content in the precipitate increases up to about 80, 90, 95, 98, 99, 99.9 or 100 wt %. The lignin extract can contain residual amounts of other non-lignin components, such as water, glucan, xylan, and acetic acid.

In refinements, the lignin extract is substantially free of the trialkylamine. That is, the lignin extract suitably contains less than about 0.5, 1, 3, 5, or 7 wt % of the trialkylamine. Alternatively or additionally, at least about 80, 90, 95, 98, or 99 wt. % and/or up to 90, 95, 99, or 100 wt. % of the trialkylamine used for extraction in the aqueous extraction solution is recovered and/or removed from the lignin extract.

In refinements, the lignin extract include at least about 50% of the lignin initially present in the lignocellulosic biomass. For example, the lignin extract can include at least about 50, 60, 70, or 80% and/or up to about 70, 80, 90, 95, 98, 99, or 100% of the lignin initially present in the lignocellulosic biomass.

In refinements, the method further comprises rinsing the lignin extract. The lignin extract can be rinsed with a variety of suitable organic solvents or other rinse fluids, such as, but not limited to, ammonium hydroxide, aqueous amines, methanol, or acetone. The rinsing fluids can serve to re-dissolve the lignin extract.

In refinements, the aqueous extraction solution is substantially free of additional organic solvents other than trialkylamine(s). In refinements, the biomass extraction mixture is substantially free of additional organic solvents. For example, the aqueous extraction solution and/or the biomass extraction mixture can be substantially free of organic solvents such as ethanol, acetone, acetamide, toluene, and the like. As used herein, "substantially free of additional organic solvents" or "substantially free of organic solvents other than the trialkylamine(s)" means that the aqueous extraction solution and/or the biomass extraction mixture suitably contains less than about 0.01, 0.1, 0.2, 0.5, 1, 2, or 5 wt. % of any additional organic solvents, individually and/or collectively, other than the trialkylamine. In particular, when the aqueous extraction solution and/or biomass extraction mixture is free of acetamide, the aqueous extraction solution and/or biomass extraction mixture can be used in the production of human foods and/or feeds for animal, bacteria, fungi, and other organisms. Additionally, when the aqueous extraction solution and/or biomass extraction mixture is free of acetamide, the aqueous extraction solution and/or biomass extraction mixture can be used as a starting material for chemical, electrochemical, and/or enzymatic processes to convert any hemicellulose or cellulose present in the extraction solution or mixture into other useful products.

In refinements, the biomass extraction mixture comprises acetic acid; and the method further comprises recovering and optionally further processing the acetic acid. As described above, the acetic acid can be present in substantial amounts in the extraction fluid, for example in deprotonated form or as a complex with trialkylamine, making it accessible for the subsequent processing, such as separation, purification, and/or conversion into other products, such as acetone.

In refinements, the aqueous extraction solution is substantially free of ammonia. In refinements, the biomass extraction mixture is substantially free of ammonia. As used herein, "substantially free of ammonia" means that the aqueous extraction solution and/or the biomass extraction mixture suitably contains less than about 0.01, 0.1, 0.2, 0.5, 1, 2, or 5 wt. % of ammonia.

In refinements, the aqueous extraction solution is substantially free of a sulfur component. In refinements, the biomass extraction mixture is substantially free of a sulfur component. For example, the aqueous extraction solution and/or the biomass extraction mixture can be substantially free of a sulfur component(s) such as elemental sulfur, sulfides, sulfates, sulfites, thiosulfates, polysulfides, mercaptans, and the like. As used herein, "substantially free of a sulfur component" means that the aqueous extraction solution and/or the biomass extraction mixture suitably contains less than about 0.01, 0.1, 0.2, 0.5, 1, 2, or 5 wt. % of any sulfur components, individually and/or collectively.

The source of the lignocellulosic biomass is not particularly limited. Any plant biomass comprising lignin is considered suitable for use in the methods described herein. In refinements, the lignocellulosic biomass includes a grass, switchgrass, rice hull, husk, stalk, cob, softwood, hardwood, or any other plant suitable for lignin extraction. In refinements, the lignocellulosic biomass comprises a hardwood, such as poplar.

In refinements, the method further comprises admixing a second lignocellulosic biomass with a second aqueous extraction solution comprising water and the removed trialkylamine under temperature and pressure sufficient to extract lignin (e.g., depolymerize and/or solubilize lignin) from the second lignocellulosic biomass, thereby providing a second biomass extraction mixture comprising the water, the removed trialkylamine, and the lignin. That is, in refinements, the disclosure further relates to a recycle process for the trialkylamine, which can be re-used to extract second and subsequent batches of other lignocellulosic biomass feed material. The concentration and component properties for the second aqueous extraction solution, as well as the corresponding extraction conditions and products, can generally be the same as above for the base process.

In refinements, the method further comprises separating extracted lignocellulosic biomass (e.g., residual solids/biomass) from the biomass extraction mixture. Separation of the biomass can be performed before, during, or after removal of the trialkylamine from the biomass extraction mixture to form the lignin extract. The extracted biomass can contain one or both of cellulose and hemicellulose, and it can be used as an animal feed material and/or a cellulosic feedstock for hydrolysis (e.g., enzymatic or otherwise) to form one or more monosaccharides.

In refinements, the method is performed batchwise or continuously.

In refinements, the method further comprises thermolyzing the lignin extract to provide a carbon material. For example, the lignin can be pyrolyzed to form carbon materials such as carbon layers, carbon fibers, and other carbon-carbon materials. In some cases, a lignin fiber can be spun out of the lignin extract and hardened by heating to a temperature ranging from about 200° C. to about 400° C. The hardened fiber can then be pyrolyzed under an inert atmosphere (e.g. under nitrogen or argon gas) at a temperature ranging from about 1000° C. to about 2400° C. to graphitize the carbon and form a carbon fiber. The resulting carbon fiber can, optionally, be further woven into a tow, rope, or fabric.

Optionally, carbon materials made from the carbon tow, rope, or fabric can be additionally impregnated with a lignin extract, obtained using the methods described herein. The lignin-impregnated carbon materials can then be thermalized to evaporate any solvent, carbonize the lignin, and, optionally, graphitize the resulting carbon. This process can result in a carbon-carbon material.

In another aspect, the disclosure relates to a feed material comprising: a lignin extract and extracted lignocellulosic biomass formed by any of the preceding extraction methods, wherein the lignin extract and the extracted lignocellulosic biomass are free or substantially free from acetamide. The lignin extract and/or the extracted lignocellulosic biomass can be incorporated into a food item and/or subsequently fed to an animal or other organism.

In another aspect, the disclosure relates to a method for enzymatic hydrolysis of at least one of cellulose and hemicellulose, the method comprising: providing a lignin extract and extracted lignocellulosic biomass formed by any of the preceding extraction methods, wherein the lignin extract and the extracted lignocellulosic biomass are free or substantially free from acetamide, and the extracted lignocellulosic biomass comprises at least one of cellulose and hemicellulose; and treating the extracted lignocellulosic biomass with an enzyme (e.g., to hydrolyze the cellulose and/or hemicellulose to form glucose and/or other hexoses or pentoses). The disclosure likewise relates to analogous methods of chemical and/or electrochemical hydrolysis of at least one of cellulose and hemicellulose by chemically and/or electrochemically treating extracted lignocellulosic biomass to hydrolyze the cellulose and/or hemicellulose, for example to form glucose and/or other hexoses or pentoses.

While the disclosed compounds, articles, methods and compositions are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWING

For a more complete understanding of the disclosure, reference should be made to the following detailed description and accompanying drawing wherein.

DETAILED DESCRIPTION

Figure 1:
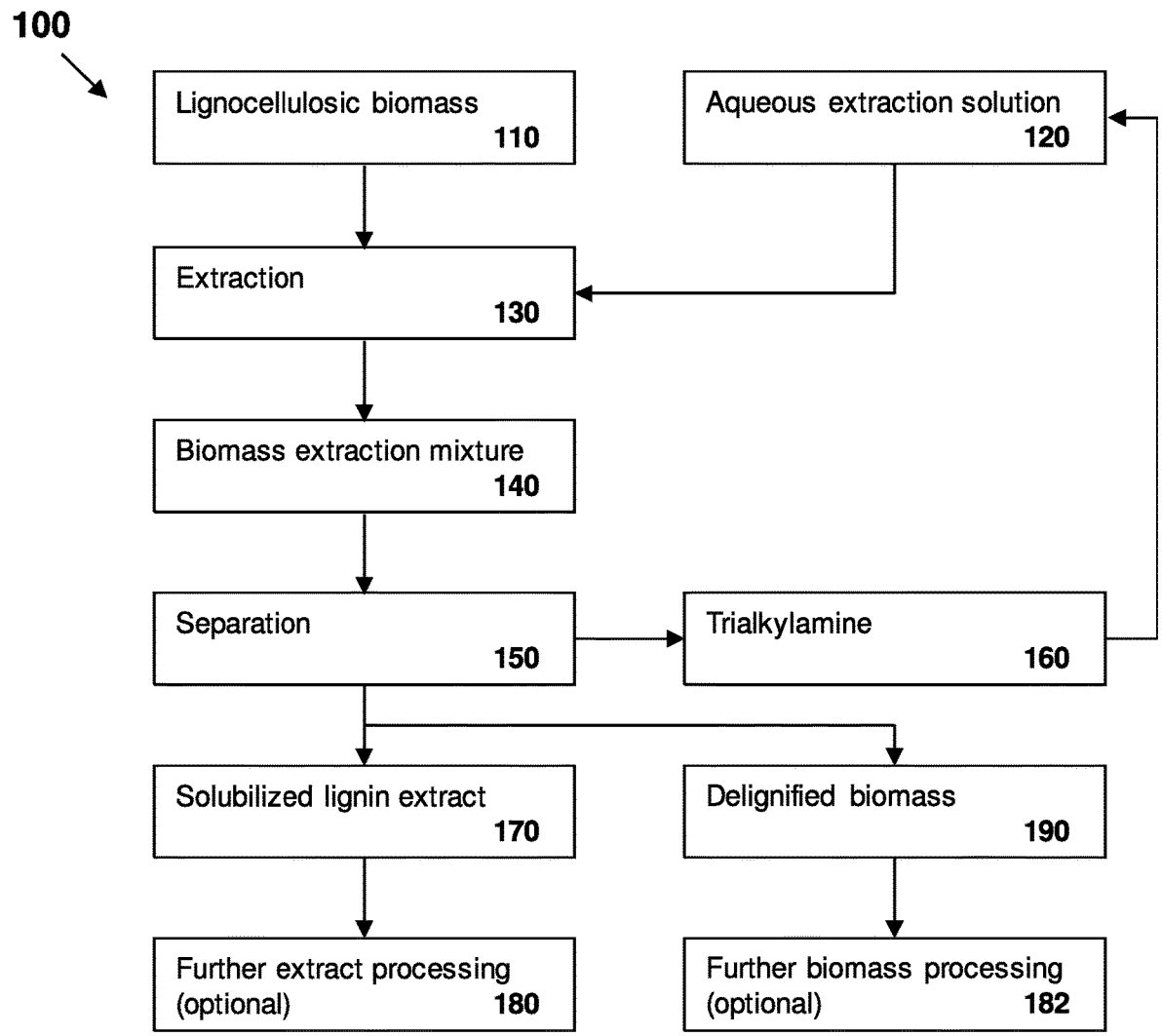
FIG. 1 is a flow chart illustrating a method for extracting lignin from a lignocellulosic biomass according to the disclosure.

The disclosure relates to methods for extracting lignin from lignocellulosic biomass using volatile trialkylamines. A lignocellulosic biomass is combined with an aqueous extraction solution including the trialkylamine and water to provide a biomass extraction mixture that can at least partially extract lignin from the lignocellulosic biomass. The method further includes removing the trialkylamine from the biomass extraction mixture. The method further relates to the utilization of the resulting materials. For example, the lignin extract can be used to make carbon fibers and carbon-carbon materials. The delignified biomass, enriched with hemicellulose and cellulose, can be used as feed for animals, fungi and/or bacteria. Also, the components of the delignified biomass can be hydrolyzed, for example chemically or enzymatically, into pentoses and/or hexoses. Those pentoses and/or hexoses themselves can be used as a feed or starting material for the subsequent conversion into other products. Acetic acid, removed from the biomass in form of trialkylammonium acetate, can be recovered from the mixture and used as such or converted into other products such as acetone.

According to 2016 statistics from the U.S. Department of Energy (DOE), the United States has the potential to produce at least one billion dry tons of biomass per year. That biomass can be composed of agricultural, forestry, waste, and algal materials, which can be collected without adversely affecting the environment, and can be used in the production of food or other agricultural products. This amount of biomass can also be used to produce enough biofuel, bioenergy, and bioproducts to displace approximately 30% of the 2005 U.S. petroleum consumption. Moreover, if unusable for agriculture, land could be planted with cellulose-producing crops, such as switchgrass, which could be used to generate substitute products for the current oil imports into the United States.

Cellulose, comprising 40-50% of dry wood weight, is the most common organic polymer. Thus, biomass conversion comprising cellulose hydrolysis into, for example, glucose, which could be followed by chemical and/or biochemical transformations into final products (e.g., biofuel) would be of high added value. Furthermore, hydrolysis of hemicellulose, comprising 20-30% of dry wood weight, could add even more value, by its conversion to usable materials and fuels.

Structurally, cellulose consists of crystalline and amorphous regions, covalently bound to the surrounding amorphous hemicellulose. Hemicellulose, in turn, is surrounded by hydrophobic phenolic amorphous polymers, i.e., lignin. Lignin increases the mechanical strength of wood by spreading the mechanical strain. Furthermore, lignin protects the enclosed carbohydrates from enzymatic attack by herbivores. Upon degradation, lignin releases toxic low-molecular weight phenolic compounds that further contribute to plant protections. Thus, lignin can significantly increase the recalcitrance of the biomass, which helps the plant to survive, but complicates the conversion of the biomass into fuels and chemicals.

Lignin dissolves at about 140-170° C. in bases—for example, in aqueous NaOH solutions containing polysulfides (i.e., Kraft process), or sodium carbonate dissolved in glycerol. This dissolution is accompanied by depolymerization and covalent detachment of the lignin from the hemicellulose matrix.

The Kraft process, and other known methods of lignin dissolution, require significant amounts of reagents and energy, generating large amounts of waste, which leads to the increased cost of the final, biobased products, such as cellulosic ethanol, making such products economically uncompetitive.

Moreover, relatively recently, two techniques using ammonia (i.e., Ammonia Fiber/Freeze Explosion (AFEX) and Ammonia Recycle Percolation (ARP)) have been developed for biomass pretreatment. Each of these techniques uses ammonia, which has an affinity for the biomass's constituents and is well suited for subsequent simultaneous saccharification and cofermentation (SSCF) because the treated biomass retains cellulose, as well as hemicellulose. Although each of these techniques have advantages, neither has been commercialized for an industrial scale as (1) both processes utilize ammonia—a toxic gas—under pressure; (2) the pressurized reactors utilize significant amounts of stainless steel, increasing costs; (3) the high vaporization enthalpy of ammonia leads to significant energy expense to operate the equipment; (4) the reaction of ammonia with lignocellulosic biomass forms toxic byproducts (e.g., acetamide, pyrazines, 4-hydroxybenzaldehyde, phenolic amides, etc.); and (5) ammonia is corrosive for cobalt, nickel, copper, and zinc alloys, thereby limiting materials usable for equipment.

Accordingly, as provided herein, it was found that trialkylamines can be used for extracting lignin from lignocellulose biomass instead of ammonia or inorganic bases. Specific advantages of the present disclosure can include: (1) lower operational pressures, resulting in decrease costs; (2) lower vaporization heat, resulting in reduced energy expenses; (3) no formation of toxic byproducts such as acetamide and pyrazines; (4) potential to remove any toxic lignin degradation products via percolation; (5) increased recovery of trialkylamines for recycling and reuse, in comparison with ammonia; (6) an opportunity to selectively extract the valuable minor biomass components; and (7) no corrosion of metals sensitive to ammonia, thereby expanding the range of suitable equipment materials.

FIG. 1 illustrates a general method 100 for extracting lignin from a lignocellulosic biomass according to the disclosure. Lignocellulosic biomass 110 and an aqueous extraction solution 120 are initially mixed or otherwise combined, for example by being continuously fed or batch-wise charged to a suitable extraction vessel, for example a pressure vessel. The aqueous extraction solution 120 includes water and at least one trialkylamine such as trimethylamine. Inclusion of water substantially improves extraction efficiency in comparison to an extraction solvent that includes trialkylamine alone or in combination with an organic co-solvent. The mixture of the lignocellulosic biomass 110 and the aqueous extraction solution 120 are maintained under sufficient temperature and pressure to extract 130 lignin from the lignocellulosic biomass 110. Extraction 130 can include one or more modes lignin pretreatment, such as depolymerization and/or solubilization of lignin from the biomass 110. Suitable extraction 130 conditions can include temperatures ranging from about 100-200° C. and contact times (or mean residence times for continuous processes) up to about 20 hr or 24 hr. Extraction 130 forms a corresponding biomass extraction mixture 140, generally in the same vessel used for extraction 130. The biomass extraction mixture 140 includes the water and trialkylamine from the aqueous extraction solution 120 as well as extracted lignin. The biomass extraction mixture 140 can further include biomass-extractable components such as one or more of acetic acid, peptides, amino acids, inorganic compounds, aromatic compounds, low molecular weight lignin decomposition products, lipids, etc. The biomass extraction mixture 140 is then separated 150 to remove the trialkylamine 160 from the extraction mixture 140. Suitable separation 150 techniques include distillation or solvent evaporation, for example being performed in the same or a different vessel as that used for extraction 130, and likewise on a continuous or batch basis. In some embodiments, the separated 150 trialkylamine 160 suitably is recycled, for example by being mixed with water to re-form additional aqueous extraction solution 120, which can be fed to a subsequent batch extraction process or continuously fed back to a continuous extraction process, for example. Removal of the trialkylamine 160 from the biomass extraction mixture 140 forms a corresponding solubilized lignin extract 170. The lignin extract 170 typically can contain about 20-60 wt. % lignin, for example in combination with other components such as water, glucan, xylan, acetic acid, etc. The lignin extract 170 and/or remaining extracted lignocellulosic biomass residue 190 (delignified biomass) can be subjected to one or more of a variety of optional downstream processes 180 (e.g., for the extract 170) and/or 182 (e.g., for the biomass residue 190). For example, minor biomass components (e.g., acetic acid, valuable phenolic compounds) can be separated from the lignin extract 170. Alternatively or additionally, the lignin extract 170 (or the remaining portion after separation of some components) can be thermalized into carbon materials, hydrogenated into fuels, hydroaminated into surfactants and coagulants, and/or converted into other materials. The lignocellulosic biomass solid residue 190 remaining after extraction can be fed to an animal or organism, for example after being incorporated into a food item. Additionally, the lignocellulosic biomass solid residue 190 remaining after extraction can be treated with a hydrolytic enzyme or subjected to another hydrolysis process to hydrolyze any cellulose and/or hemicellulose to form corresponding monosaccharides.

Figure 2:
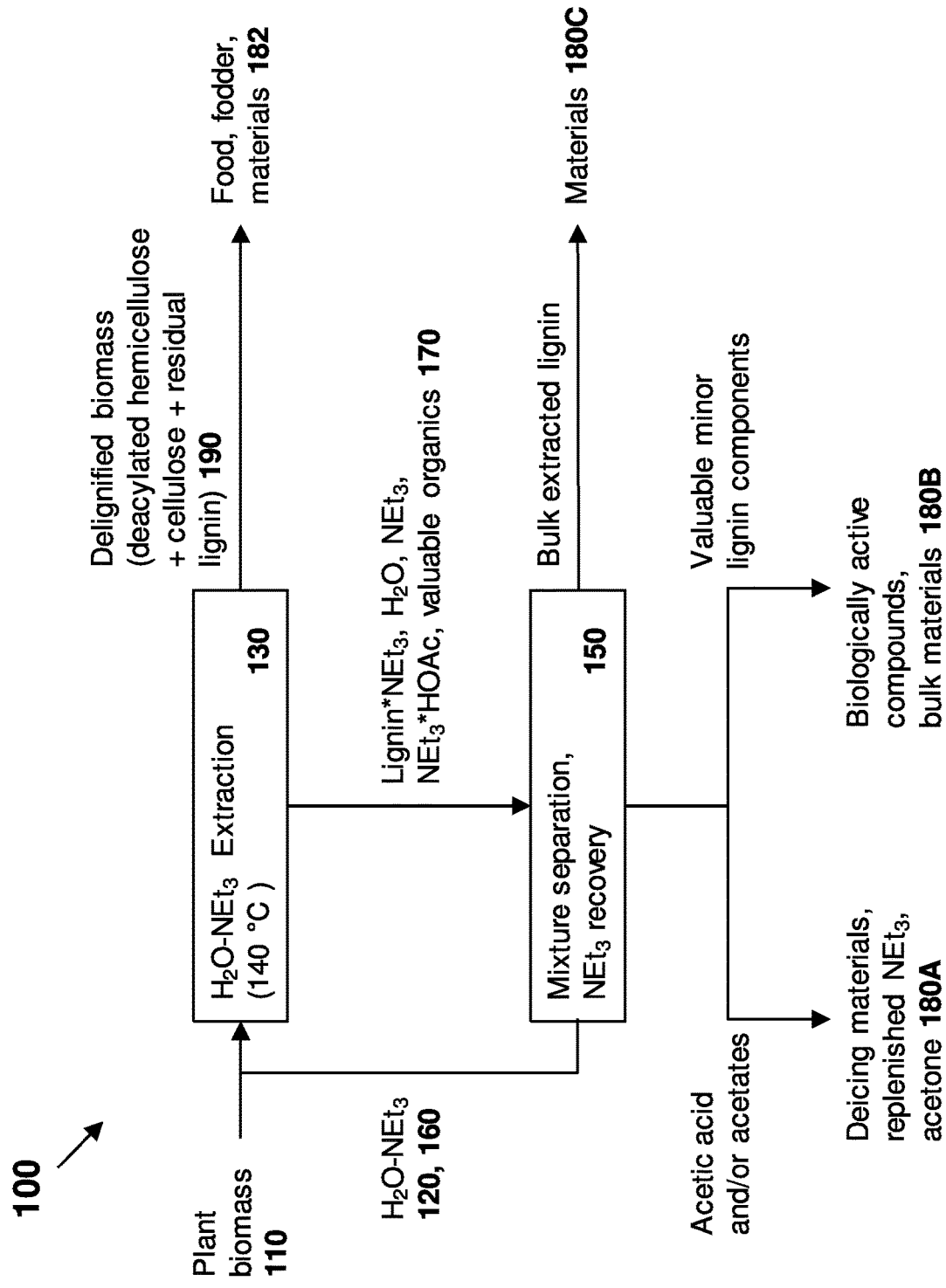
FIG. 2 is a flow chart illustrating a method for extracting lignin from a lignocellulosic biomass according to a particular embodiment the disclosure.

FIG. 2 provides a process flow diagram of a non-limiting embodiment to illustrate an integrated process 100 that provides a variety of useful products resulting from extraction of lignocellulosic biomass using trialkylamines to extract lignin. Plant biomass 110 is suitably extracted 130 at 140° C. using a water/triethylamine (NEt$_3$) mixture 120 to provide delignified biomass 190 as a residual solids component (i.e., biomass solids having been already extracted to remove lignin etc.) and a lignin extract 170 as a liquid-phase component. The delignified biomass 190 can be used as is or further processed 182 (e.g., via hydrolysis) to provide various food, fodder, or other useful materials. The lignin extract 170, in addition to solubilized lignin, can include other valuable organic components, such as acetic acid (e.g., illustrated an NEt$_3$·HOAc triethylamine adduct with acetic acid) and phenolic compounds such as p-hydroxybenzoic acid (PHBA), among others. The lignin extract 170 can be processed 180 (e.g., via common separation techniques) to recover triethylamine 160 for further extractions, acetic acid and/or acetates 180A (e.g., for deicing materials, recovered triethylamine, acetone), minor lignin components 180B, and/or bulk extracted lignin 180C. Thus, initial extraction 130 of the plant biomass 110 according to the disclosure can provide multiple different value-added materials or products.

Lignocellulosic Biomass

As provided herein, the disclosure relates to methods for extracting lignin from lignocellulose biomass. The source of the lignocellulosic biomass is not particularly limited, and any plant biomass comprising lignin can be considered suitable for use in the methods as described herein. Examples of suitable lignocellulosic biomasses include, but are not limited to, grass, switchgrass, rice hull, husk, stalk, cob, softwood, hardwood, or any other plant suitable for lignin extraction. In embodiments, the lignocellulosic biomass includes a wood-based biomass (e.g., a softwood or a hardwood). In embodiments, the lignocellulosic biomass includes poplar (i.e., a hardwood). Examples of poplar include, for example, poplar NM6, poplar DN-34, and genetically modified poplar types.

Aqueous Extraction Solution

The disclosure provides methods of extracting lignin from a lignocellulosic biomass including admixing a lignocellulosic biomass with an aqueous extraction solution. The aqueous extraction solution can include water and a trialkylamine. The trialkylamine can have a structure of Formula (I):

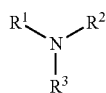

(I)

wherein each of $R^1$, $R^2$, and $R^3$ is independently $C_{1-6}$ alkyl.

As used herein, the term "alkyl" refers to straight chained and branched saturated hydrocarbon groups. The term $C_n$ means the group has "n" carbon atoms. For example, $C_3$ alkyl refers to an alkyl group that has 3 carbon atoms. $C_{1-6}$ alkyl refers to an alkyl group having a number of carbon atoms encompassing the entire range (i.e., 1 to 6 carbon atoms), as well as all subgroups (e.g., 2-6, 2-5, 2-4, 2-3, 1-5, 1-4, 1-3, 1-2, 3-6, 3-5, 3-4, 4-6, 4-5, 5-6, 1, 2, 3, 4, 5, and 6 carbon atoms). Nonlimiting examples of alkyl groups include methyl, ethyl, n-propyl, isopropyl, n-butyl, sec-butyl (2-methylpropyl), tert-butyl (1,1-dimethylethyl), n-pentyl, and n-hexyl.

In embodiments, $R^1$ is methyl. In embodiments, $R^1$ is ethyl. In embodiments, $R^1$ is n-propyl. In embodiments, $R^1$ is isopropyl. In embodiments, $R^1$ is n-butyl. In embodiments, $R^1$ is sec-butyl. In embodiments, $R^1$ is tert-butyl. In embodiments, $R^1$ is n-pentyl. In embodiments, $R^1$ is n-hexyl. In embodiments, $R^2$ is methyl. In embodiments, $R^2$ is ethyl. In embodiments, $R^2$ is n-propyl. In embodiments, $R^2$ is isopropyl. In embodiments, $R^2$ is n-butyl. In embodiments, $R^2$ is sec-butyl. In embodiments, $R^2$ is tert-butyl. In embodiments, $R^2$ is n-pentyl. In embodiments, $R^2$ is n-hexyl. In embodiments, $R^3$ is methyl. In embodiments, $R^3$ is ethyl. In embodiments, $R^3$ is n-propyl. In embodiments, $R^3$ is isopropyl. In embodiments, $R^3$ is n-butyl. In embodiments, $R^3$ is sec-butyl. In embodiments, $R^3$ is tert-butyl. In embodiments, $R^3$ is n-pentyl. In embodiments, $R^3$ is n-hexyl. In embodiments, each of $R^1$, $R^2$, and $R^3$ is independently methyl, ethyl, propyl, or isopropyl. In embodiments, each of $R^1$, $R^2$, and $R^3$ are the same. In embodiments, each of $R^1$, $R^2$, and $R^3$ are different. In embodiments, at least two of $R^1$, $R^2$, and $R^3$ are the same.

In embodiments, each of $R^1$, $R^2$, and $R^3$ are methyl. That is, in embodiments, the trialkylamine includes trimethylamine. In embodiments, each of $R^1$, $R^2$ and $R^3$ are ethyl. That is, in embodiments, the trialkylamine includes triethylamine. In embodiments, each of $R^1$, $R^2$ and $R^3$ are propyl. That is, in embodiments, the trialkylamine includes tripropylamine. In embodiments, two of $R^1$, $R^2$ and $R^3$ are methyl and the remaining group is ethyl. That is, in embodiments, the trialkylamine includes dimethylethylamine. In embodiments, the trialkylamine is selected from the group consisting of trimethylamine, triethylamine, dimethylethylamine, tripropylamine, and combinations thereof. That is, in embodiments, the aqueous extraction solution includes a single trialkylamine. In embodiments, the aqueous extraction solution includes two or more trialkylamines.

The trialkylamine (i.e., the one or more trialkylamines) can be included in the aqueous extraction solution in an amount ranging from about 0.01 wt % or 20 wt % to about 99 wt %, based on the total weight of the aqueous extraction solution. For example, the trialkylamine can be included in an amount of at least about 0.01, 0.02, 0.04, 0.1, 0.2, 0.5, 1, 2, 4, 8, 15, 20, 25, 30, 35, 40, 45, 50, 55 or 60 wt % and/or up to about 99, 98, 97, 95, 90, 85, 80, 75, 70, 65, 50, 55, 50, or 45 wt %, based on the total weight of the aqueous extraction solution. Lower concentrations can be particularly useful, for example, with relatively water-insoluble trialkylamines such as a trihexylamine with the trialkylamine forming a water-insoluble layer. In embodiments, the trialkylamine is included in an amount ranging from about 20 wt % to about 80 wt %.

As provided herein, the aqueous extraction solution includes water. Without intending to be bound by theory, it is believed that a highly polar solvent media, such as water, stabilizes the polar transition state(s) of the intermediates in the biomass hydrolytic depolymerization process, thereby accelerating the corresponding biomass deconstruction processes, while simultaneously providing the solvent itself. In contrast, a poorly polar media, such as triethylamine, alone, would not be believed to stabilize such a polar transition state even in the presence of dissolved water molecules, so it is believed that a reaction including a trialkylamine absent water would proceed much more slowly. The high solubility of the extracted products from the lignocellulosic biomass in water also suggests their polar nature, which would advantageously be stabilized by more polar solvents (e.g., water) used in their extraction.

The water can be included in the aqueous extraction solution in an amount ranging from about 0.01 wt % or 1 wt % to about 80 wt %, based on the total weight of the aqueous extraction solution. For example, the water can be included in an amount ranging from at least about 0.01, 0.02, 0.05, 0.1, 0.2, 0.5, 1, 2, 3, 4, 5, 10, 15, 20, 25, 30, 35, 40, 45, or 50 wt % and/or up to about 80, 75, 70, 65, 60, 50, 55, 50, or 45 wt %, based on the total weight of the aqueous extraction solution. In embodiments, water is included in an amount ranging from about 20 wt % to about 80 wt %.

In embodiments, the trialkylamine and water are included in the aqueous extraction solution in a total amount of at least about 75 wt %, based on the total weight of the aqueous extraction solution. For example, in embodiments, the trialkylamine and water can be included in a total amount of at least about 75, 80, 85, 90, 95, 97, 98, 99, 99.5, 99.9 or 100 wt %, based on the total weight of the aqueous extraction solution.

In some cases, the aqueous extraction solution includes acetic acid, which can be present as deprotonated acetic acid, or in a complex with the trialkylamine (e.g., as a trialkylammonium acetate). The acetic acid can be independently separated and purified from the biomass extraction mixture. Additionally, the acetic acid can be converted into other products, such as calcium acetate (a deicer), acetone, new triethylamine, or other compounds.

The aqueous extraction solution can be substantially free of additional components. For example, the aqueous extraction solution can be substantially free of organic solvents such as ethanol, acetone, acetamide, toluene, and the like. As used herein, "substantially free of additional organic solvents" or "substantially free of organic solvents other than the trialkylamine(s)" means that the aqueous extraction solution suitably contains less than about 0.01, 0.1, 0.2, 0.5, 1, 2, or 5 wt. % of any additional organic solvents, individually and/or collectively, other than the trialkylamine. In particular, when the aqueous extraction solution is free of acetamide, the aqueous extraction solution can be used in the production of human foods and/or feeds for animal, bacteria, fungi, and other organisms. Additionally, when the aqueous extraction solution is free of acetamide, the aqueous extraction solution can be used as a starting material for chemical, electrochemical, and/or enzymatic processes to convert any hemicellulose, cellulose, or other component present in the aqueous extraction solution into other useful products.

In embodiments, the aqueous extraction solution is substantially free of ammonia. As used herein, "substantially free of ammonia" means that the aqueous extraction suitably contains less than about 0.01, 0.1, 0.2, 0.5, 1, 2, or 5 wt. % of ammonia.

In embodiments, the aqueous extraction solution is substantially free of a sulfur component. For example, in embodiments, the aqueous extraction solution can be substantially free of a sulfur component(s) such as elemental sulfur, sulfides, sulfates, sulfites, thiosulfates, polysulfides, mercaptans, and the like. As used herein, "substantially free of a sulfur component" means that the aqueous extraction solution suitably contains less than about 0.01, 0.1, 0.2, 0.5, 1, 2, or 5 wt. % of any sulfur components, individually and/or collectively.

Method of Extraction

The method of extraction lignin from a lignocellulosic biomass, according to the disclosure, includes admixing a lignocellulosic biomass, as described herein, with an aqueous extraction solution, as described herein. The admixing occurs under a temperature and pressure sufficient to extract lignin from the lignocellulosic biomass, thereby providing a biomass extraction mixture.

The admixing can be performed at a temperature in a range of about 100° C. to about 200° C. For example, the admixing can be performed at a temperature of at least about 100, 110, 120, 125, 130, 140, 150, or 160° C. and/or up to about 200, 190, 180, 175, 170, 160, 150 or 140° C. In embodiments, the method comprises performing the admixing at a temperature of at least about 130° C. While lignin depolymerization can occur at temperatures of about 100° C., the reaction proceeds at a slower rate, lengthening the time of the reaction. In some embodiments, the method comprises performing the admixing at a temperature ranging from about 130° C. to about 160° C. Temperatures in this range generally allow the lignin depolymerization to occur within a few hours.

The admixing can be performed at a pressure sufficient to extract lignin from the lignocellulosic biomass. In general, the pressure under which the admixing is performed has to be sufficient to prevent boiling and evaporation of the aqueous extraction solution. In embodiments, the admixing is performed in a pressurized vessel. The pressure in the pressurized vessel can be at a sum of the vapor pressure of the water, the pressure of air or other gas filling the reactor space above the liquids and biomass, and the vapor pressure of trialkylamine. The vapor pressure of the trialkylamine will depend on the molecular weight and concentration of the particular trialkylamine used in the aqueous extraction solution. For example, high concentrations of trialkylamines having a low molecular weight (e.g. trimethylamines) result in higher vapor pressure.

The admixing can be performed for a period of time sufficient to extract lignin from the lignocellulosic biomass. In embodiments the admixing can be performed for up to about 20 hours. For example, in embodiments, the admixing can be performed for at least about 10 mins, 20 mins, 30 mins, 45 mins, 1 hr, 2 hr, 5 hr, 8 hr, or 10 hr and/or up to about 1 hr, 2 hr, 5 hr, 8 hr 10 hr, 12 hr, 15 hr, 18 hr, or 20 hr. The period of time necessary to perform the extraction is dependent on the pressure, temperature, and manufacturing equipment used. For example, using industrial-scale equipment, the extraction may be completed in a shorter period of time than it would be if using lab-scale equipment. The period of time of the reaction suitably is sufficiently long to ensure that the reaction homogeneously and efficiently thermalizes. Performing the reaction too quickly may require an increased temperature that can undesirably decompose other biomass components, such as cellulose or hemicellulose. Furthermore, high temperatures can lead to high vapor pressure and high equipment cost.

As described above, the admixing occurs under a temperature and pressure sufficient to extract lignin from the lignocellulosic biomass, thereby providing a biomass extraction mixture. The biomass extraction mixture includes the water, the trialkylamine, and the lignin solubilized therein from the lignocellulosic biomass.

Like the aqueous extraction solution, the biomass extraction mixture can be substantially free of additional components. For example, the biomass extraction mixture can be substantially free of organic solvents such as ethanol, acetone, acetamide, toluene, and the like. As used herein, "substantially free of additional organic solvents" or "substantially free of organic solvents other than the trialkylamine(s)" means that the biomass extraction mixture suitably contains less than about 0.01, 0.1, 0.2, 0.5, 1, 2, or 5 wt. % of any additional organic solvents, individually and/or collectively, other than the trialkylamine. In particular, when the biomass extraction mixture is free of acetamide, the biomass extraction mixture can be used in the production of human foods and/or feeds for animal, bacteria, fungi, and other organisms. Additionally, when the biomass extraction mixture is free of acetamide, the biomass extraction mixture can be used as a starting material for chemical, electrochemical, and/or enzymatic processes to convert any hemicellulose or cellulose present in the biomass extraction mixture into other useful products.

In embodiments, the biomass extraction mixture is substantially free of ammonia. As used herein, "substantially free of ammonia" means that the biomass extraction mixture suitably contains less than about 0.01, 0.1, 0.2, 0.5, 1, 2, or 5 wt. % of ammonia.

In embodiments, the biomass extraction mixture is substantially free of a sulfur component. For example, in embodiments, the biomass extraction mixture can be substantially free of a sulfur component(s) such as elemental sulfur, sulfides, sulfates, sulfites, thiosulfates, polysulfides, mercaptans, and the like. As used herein, "substantially free of a sulfur component" means that the biomass extraction mixture suitably contains less than about 0.01, 0.1, 0.2, 0.5, 1, 2, or 5 wt. % of any sulfur components, individually and/or collectively.

In embodiments, the biomass extraction mixture includes acetic acid. In embodiments wherein the biomass extraction mixture includes acetic acid, the method can further include recovering and optionally further processing the acetic acid. As described above, in some cases, the aqueous extraction solution includes acetic acid, which can be present as deprotonated acetic acid, or in a complex with the trialkylamine (e.g., as a trialkylammonium acetate). The acetic acid can be independently separated and purified from the biomass extraction mixture, and thereafter converted into other products, such as acetone, calcium acetate, or triethylamine.

The method further includes removing the trialkylamine from the biomass extraction mixture, thereby forming a solubilized lignin extract. Removing the trialkylamine from the biomass extraction mixture can include performing one or more of solvent evaporation and distillation. The trialkylamine can be removed through solvent evaporation and distillation under conditions which are within the purview of the person of ordinary skill in the art. The trialkylamine can be removed and recycled to be used, for example, in subsequent lignin extractions according to the methods described herein.

The lignin can be present in the lignin extract in an amount ranging from about 5 wt % or 20 wt % to about 60 wt %, based on the total weight of the lignin extract. For example, the lignin can be present in the lignin extract at an amount ranging from at least about 5, 10, 20, 30, 40, or 50 wt % and/or up to about 30, 40, 50, or 60 wt % based on the total weight of the lignin extract. Precipitates with higher lignin content may be obtained by selective lignin precipitation from the lignin extract by the addition of acids, such as acetic acid, or by amine evaporation. In these cases, the other extracted components will remain in the lignin extract, while lignin content in the precipitate increases up to about 80, 90, 95, 98, 99, 99.9 or 100 wt %. The lignin extract can contain residual amounts of other non-lignin components, such as water, glucan, xylan, and acetic acid.

The lignin extract can be substantially free of the trialkylamine. That is, the lignin extract can suitably contain less than about 0.5, 1, 3, 5, or 7 wt % of the trialkylamine. Alternatively or additionally, at least about 75, 80, 90, 95, 98, or 99 wt. % and/or up to 90, 95, 99, or 100 wt. % of the trialkylamine used for extraction in the aqueous extraction solution can be recovered and/or removed from the lignin extract through, for example, solvent evaporation, distillation, or recovery of its adducts with acids.

In embodiments, the lignin extract includes at least about 50% of the lignin initially present in the lignocellulosic biomass. For example, the lignin extract can include at least about 50, 60, 70, or 80% and/or up to about 70, 80, 90, 95, 98, 99, or 100% of the lignin initially present in the lignocellulosic biomass.

The method can further include rinsing the lignin extract. The lignin extract can be rinsed with a variety of suitable organic solvents or other rinse fluids, such as, but not limited to, ammonium hydroxide, aqueous amines, methanol, or acetone. The rinsing fluids can serve to re-dissolve the lignin extract. In embodiments, the method further includes rinsing the lignin extract with ammonium hydroxide.

The method, as described herein, can further include admixing a second lignocellulosic biomass with a second aqueous extraction solution including water and a trialkylamine. The second lignocellulosic biomass and the second aqueous extraction solution can be as described, above, for the lignocellulosic biomass and the aqueous extraction solution. In embodiments, the trialkylamine in the second aqueous extraction solution is the removed trialkylamine (e.g., from the first admixing and removing steps). The admixing of the second lignocellulosic biomass with the second aqueous solution can be performed at any temperature, pressure, or duration, as described herein.

The admixing of the second lignocellulosic biomass with the second aqueous extraction mixture provides a second biomass extraction mixture comprising water, the trialkylamine (e.g., the removed trialkylamine), and the lignin.

In embodiments, the method further includes separating extracted lignocellulosic biomass (e.g., residual solids/biomass) from the biomass extraction mixture. Separation of the biomass can be performed before, during, or after removal of the trialkylamine from the biomass extraction mixture to form the lignin extract. The extracted biomass can contain one or both of cellulose and hemicellulose, and it can be used as an animal feed material and/or a cellulosic feedstock for hydrolysis (e.g., enzymatic or otherwise) to form one or more monosaccharides.

The method according to the disclosure can be performed batchwise or continuously. In embodiments, the method is performed batchwise. In embodiments, the method is performed continuously (e.g., in the same pressurized vessel).

The method can further include thermolyzing the lignin extract to provide a carbon material. For example, the lignin can be pyrolyzed to form carbon materials such as carbon layers, carbon fibers, and other carbon-carbon materials. In some cases, a lignin fiber can be spun out of the lignin extract and hardened by heating to a temperature ranging from about 200° C. to about 400° C., for example about 200, 225, 250, 275, 300, 325, 350, 375, or 400° C. The hardened fiber can then be pyrolyzed under an inert atmosphere (e.g.

under nitrogen or argon gas) at a temperature ranging from about 1000° C. to about 2400° C. (e.g., about 1000, 1250, 1500, 1750, 2000, 2100, 2200, 2300, or 2400° C.) to graphitize the carbon and form a carbon fiber. The resulting carbon fiber can, optionally, be further woven into a tow, rope, or fabric.

Optionally, carbon materials made from the carbon tow, rope, or fabric can be additionally impregnated with a lignin extract, obtained using the methods described herein. The lignin-impregnated carbon materials can then be thermalized to evaporate any solvent, carbonize the lignin, and, optionally, graphitize the resulting carbon. This process can result in a carbon-carbon material.

Advantageously, the methods of the disclosure have the benefit of not needing fine grinding of the lignocellulosic biomass to achieve efficient biomass delignification, which is particularly useful when carried out at an industrial scale, as it would save energy. Moreover, unlike fast pyrolysis, trialkylamine extraction does not need careful biomass pre-drying, as the reaction includes water, thereby presenting an additional advantage.

Furthermore, the methods according to the disclosure do not require inorganic chemicals. The trialkylamine can be efficiently recycled by distillation. These present advantages over the Kraft method and sulfite process, which result in significant amounts of inorganic compounds.

Feed Material

The disclosure further provides a feed material including a lignin extract and extracted lignocellulosic biomass formed by the methods described herein. The lignin extract and/or the extracted lignocellulosic biomass can be incorporated into a food item and/or subsequently fed to an animal or other organism, such as livestock. In embodiments, the extracted lignocellulosic biomass is incorporated into a food item. In embodiments, the extracted lignocellulosic biomass is subsequently fed to an animal.

In embodiments, the lignin extract is substantially free of acetamide. In embodiments, the lignocellulosic biomass is substantially free of acetamide. In embodiments, the feed material is substantially free of acetamide. As used herein, "substantially free of acetamide" means that the lignin extract and/or the lignocellulosic biomass and/or the feed material suitably contains less than about 0.01, 0.1, 0.2, 0.5, 1, 2, or 5 wt. % of ammonia.

Methods for Enzymatic Hydrolysis of Cellulose and Hemicellulose

The disclosure further provides methods for enzymatic hydrolysis of at least one of cellulose and hemicellulose. The method can include providing a lignin extract and extracted or residual lignocellulosic biomass formed by any one of the preceding extraction methods and treating the extracted or residual lignocellulosic biomass with an enzyme.

In embodiments, the lignin extract is substantially free of acetamide. In embodiments, the extracted or residual lignocellulosic biomass is substantially free of acetamide. In embodiments, the lignin extract and the extracted or residual lignocellulosic biomass are substantially free of acetamide. In embodiments, the extracted or residual lignocellulosic biomass includes at least one of cellulose or hemicellulose.

Examples of suitable enzymes include, but are not limited to, those that are capable of hydrolyzing the cellulose and/or hemicellulose to form glucose and/or other hexoses or pentoses. The disclosure further provides analogous methods of chemical and/or electrochemical hydrolysis of at least one of cellulose and hemicellulose by chemically and/or electrochemically treating extracted lignocellulosic biomass to hydrolyze the cellulose and/or hemicellulose, for example to form glucose and/or other hexoses or pentoses.

EXAMPLES

Three poplar NM6 biomass samples were extracted using aqueous trimethylamine, anhydrous triethylamine ("neat" triethylamine), wet triethylamine (anhydrous triethylamine and water). A poplar DN-34 biomass sample was extracted with wet triethylamine, and subsequently underwent lignin extract thermolysis. Each of these procedures are described in detail, below. Lignin content in both the starting material and the extract were determined according to a standard NREL procedure (TP-510-42618). Glucan and xylose contents of the various biomass fractions were measured by liquid chromatography of the corresponding acid-digested solutions.

Trialkylamines have favorable properties as lignin extraction solvents as compared to ammonia and inorganic bases commonly used. Like ammonia, but unlike inorganic bases, trialkylamines can be separated and recovered from an extract by distillation. Unlike ammonia, however, trialkylamines have an additional advantage that they do not generally participate in side reactions that form hazardous or other byproducts, in particular via irreversible reactions. Tables 1 and 2 below illustrate some of the comparative properties and reactivity for ammonia ($NH_3$), trimethylamine ($NMe_3$), and trimethylamine ($NEt_3$), in particular as they relate to lignin extraction.

TABLE 1

Properties of $NH_3$, $NMe_3$, and $NEt_3$

| | $NH_3$ | $NMe_3$ | $Net_3$ |
|---|---|---|---|
| State | Malodorous gas | Malodorous gas with rotten fish smell | Liquid with somewhat sweet smell |
| Solubility in water at room temp | 31% | 25-27% | Limited |
| Boiling point, ° C. | −33 | +5 | +89 |
| $pK_b$ | 4.7 | 4.2 | 3.0 |
| Vapor pressure | Highest | Intermediate | Lowest |
| Reactor equipment cost | Highest | Intermediate | Lowest |
| Density, g/L | 682/−33.3° C. | 670/0° C. | 726 |
| Molar mass, g/mol | 17 | 59 | 101 |
| Vaporization enthalpy, kJ/mol | 23 (pure), 35 from $H_2O$ | 22 (pure), >22 from $H_2O$ | 35 |
| Vaporization enthalpy, kJ/L | 923, 1404 from $H_2O$ | ≥250 | 252 |
| Separation/recovery energy | Highest | Intermediate | Lowest |

TABLE 2

Reactivity of $NH_3$, $NMe_3$, and $NEt_3$

| | Products | | |
|---|---|---|---|
| Reagent | $NH_3$ | $NMe_3$ | $NEt_3$ |
| Acids | $NH_4^+$, reversible | $NHMe_3^+$, reversible | $NHEt_3^+$, reversible |
| Lignin | R—$NH_2$, irreversible | No rxn | No rxn |
| Acetates (esters) | $CH_3CONH_2$ (potential carcinogen, irreversible) | No rxn | No rxn |
| Carbohydrates | Pyrazines (toxic, irreversible) | No rxn | No rxn |

TABLE 2-continued

Reactivity of $NH_3$, $NMe_3$, and $NEt_3$

| Reagent | Products | | |
|---|---|---|---|
| | $NH_3$ | $NMe_3$ | $NEt_3$ |
| Alcohols ROH from lignin and carbohydrates, Ni catalyst | $RNH_2 + R_2NH + R_3N$ | No rxn | No rxn |
| Co, Ni, Cu and Zn or their alloys | Corrosion to form stable $M(NH_3)_n^{k+}$ cations | No rxn | No rxn |

Sample 1—Trimethylamine Extraction

Poplar NM6 biomass, ground to 2.2 mm (2.920 g), was placed into a TEFLON (poly(tetrafluoroethylene)) cup. Aqueous trimethylamine (25-27 wt %, Aldrich, 8.130 g) was added in a nitrogen-filled glove bag to diminish oxidation by molecular oxygen. The TEFLON cup was closed and placed into a steel pressurized vessel (Parr) and kept at 150° C. for 2.5 hours. The characteristic smell of trimethylamine produced during thermolysis indicated that some trimethylamine diffused out of the vessel. The pressurized vessel was cooled down, and the biomass was rinsed at room temperature with 150 mL of 25% ammonium hydroxide. The process was continued until ammonium hydroxide separated from the solid by centrifugation and decantation. The remaining solid biomass was rinsed with 50 mL ethanol, and the solid was dried in an oven at 85° C. The liquid was evaporated at room temperature in a stream of dry nitrogen.

Sample 2—Anhydrous Triethylamine Extraction

Poplar NM6 biomass, ground to 2.2 mm (3.213 g), was placed into a TEFLON cup and anhydrous triethylamine (Baker, 9 mL) was added in a nitrogen-filled glove bag. The TEFLON cup was closed, placed in a steel pressurized vessel (Parr) and kept at 150° C. for 5 hours. The smell of triethylamine was minimally detectable throughout the extraction. The pressurized vessel was cooled down, and the biomass was filtered on a vacuum filter and consecutively rinsed with 20 mL triethylamine, 20 mL ethanol, and 80 mL ammonium hydroxide until the leaching solution became colorless. The leached solution was dried under nitrogen, and the solid biomass was dried in an oven at 85° C.

Sample 3—Wet Triethylamine Extraction

Poplar NM6 biomass, ground to 2.2 mm (3.048 g), was placed into a TEFLON cup and anhydrous triethylamine (Baker, 7 mL) and water (2.5 mL) were added in a nitrogen-filled glove bag. The TEFLON cup was closed, placed into a steel pressurized vessel (Parr) and kept in an oven at 150° C. for 6.5 hours. The smell of triethylamine was minimally detectable throughout the extraction. The pressurized vessel was cooled down, and the biomass was filtered on a vacuum filter and rinsed with 20 mL triethylamine, and 100 mL ethanol. Upon rinsing with ammonium hydroxide, the rinsate was separated from the solids via centrifugation and decantation. The solid was dried under a nitrogen stream for 24 hours until it became visually dry, and then it was dried for an additional 24 hours in an oven at 85° C. The filtrate was dried at room temperature in a stream of dry nitrogen for 3 days.

Sample 4—Wet Triethylamine Extraction, Large Pieces

Poplar DN-34 biomass, ground to 2 mm×5 mm×10 mm rectangles (10.121 g), was thermalized with triethylamine (10.002 g) and water (10.018 g) at 150° C. for 18 hours. The resulting suspension was filtered and rinsed with 500 mL of saturated aqueous solution of triethylamine. The solid was dried for 24 hours in an oven at 85° C. The filtrate was dried at room temperature in a stream of dry nitrogen for 1 day, weighed, and the obtained mass used to calculate the yield of the extract, reported later. Subsequently, the resulting product was dried on a rotovap at 95° C. for 2 hours and analyzed by CHN and NMR spectroscopy.

Sample 5—Lignin Extract Thermolysis

Aqueous triethylamine extract, obtained from Sample 4, above, was evaporated in a stream of dry nitrogen to form a brown, viscous liquid. The mass analysis demonstrated that the liquid still contained about 50% water. A 0.252 g sample of the liquid was thermalized in a furnace at 500° C. for 5 hours in a nitrogen atmosphere. That heating resulted in formation of 0.033 g of a black carbonaceous material.

Results and Discussion

Without intending to be bound by theory, the spike in trimethylamine smell during the extraction of Sample 1 was likely attributed to the high pressure of trimethylamine. In contrast, however, such a pronounced spike did not occur when triethylamine was used. Without intending to be bound by theory, although the pressure was not measured, the observation of the spike in the smell of trimethylamine, but not triethylamine, was consistent with the vapor pressure of trimethylamine being greater than that of triethylamine. Thus, it would be advantageous, based on these results, to utilized triethylamine in an industrial reactor to minimize costs.

The results from the $^1H$ and $^{13}C$ NMR spectra of the aqueous triethylamine extract (Sample 3), redissolved in $d^6$-DMSO are shown in Tables 3 and 4, respectively.

TABLE 3

$^1H$ NMR Data of Lignin Extract with Aqueous Triethylamine (in $d^6$-DMSO)

| Peak (ppm) | Integration | Identification |
|---|---|---|
| 1.03 | 7.90(m) | triethylamine |
| 1.16 | 6.34 | alkyl groups, oily extracts |
| 1.88 | 3.00 | acetate ions |
| 2.49 | 2.69(s) | $d^6$-DMSO |
| 2.72 | 4.77(m) | triethylamine |
| 3.22 | 3.81(s) | oxygenated lignin side chains |
| 3.74 | 12.00 | carbohydrates, aryl methoxy groups, lignin side chains |
| 6.0-8.0 | 15.17 | phenolic compounds |
| 8.35 | 0.44 | formate ions |

TABLE 4

$^{13}$C NMR Data of Lignin Extract with
Aqueous Triethylamine (in d$^6$-DMSO)

| Peak (ppm) | Identification |
|---|---|
| 7.42 | alkyl groups, oily extract |
| 9.83 | triethylamine |
| 21.46 | acetate ions |
| 39.52 | d$^6$-DMSO |
| 45.24 | triethylamine |
| 54.95 | aryl methoxy groups |
| 63.10 | carbohydrates, |
| 65.50 | oxygenated lignin |
| 67.11 | side chains |
| 165.17 | formate ions |
| 172.29 | acetate ions |

The broad peak in the $^1$H NMR 6.0-8.0 ppm region is indicative of numerous phenolic compounds. The broad peak with a maximum at 3.74 ppm was assigned to carbohydrates, aryl methoxy groups and the side chains of the lignin molecules. The corresponding 67.11, 65.50, and 63.10 ppm peaks in the $^{13}$C NMR spectrum were assigned to carbohydrates and the oxygenated side chains of the lignin molecules as well. The 54.95 ppm peak in the $^{13}$C NMR spectrum was assigned to aryl methoxy groups, where the chemical shifts of the methoxy carbons were so close that they were believed to merge into a single peak.

The 3.22 ppm peak in Table 3 was assigned to oxygenated lignin side chains. The multiplets at 2.72 and 1.03 ppm in Table 3, as well as peaks at 45.24 and 9.83 ppm in Table 4 were assigned to triethylamine, which was not removed by evaporation. The peaks at 8.35 ppm ($^1$H NMR) and 165.17 ppm ($^{13}$C NMR) were assigned to formate ions. The peaks at 1.88 ppm ($^1$H NMR) and 172.29 and 21.46 ppm ($^{13}$C NMR) were assigned to acetate ions. The peaks at 1.16 ppm ($^1$H NMR) and 7.42 ($^{13}$C NMR) were assigned to alkyl groups or oily extracts from the biomass.

Without intending to be bound by theory, it was believed that the acetate ions were derived from the hydrolytic deacylation of hemicellulose. Moreover, it was believed the formation of formic acid and/or formate originated from the decomposition of carbohydrates. Without intending to be bound by theory, the presence of formate and acetate ions was believed to substantiate the substantial amounts of the retained triethylamine, as NEt$_3$·CH$_3$CO$_2$H and NEt$_3$·HCO$_2$H have much lower vapor pressure than neat triethylamine. The integration of the corresponding peaks on the NMR demonstrated that molar amounts of triethylamine and acetic acid were approximately equal, making acetic acid the main contributor of the remaining triethylamine. The ethyl peaks of triethylamine did not indicate the formation or cleavage of any C—N bonds. In the later experiments, though, small amounts of other ethyl groups, ascribed to diethylamine, were detected. Without intending to be bound by theory, it was believed that additional triethylamine could have been removed if lower pressures and higher temperatures were used. However, if ammonia had been used instead of triethylamine, it was believed that the high temperature would promote the formation of toxic formamide, acetamide, and pyrazines, as well as the irreversible retention of ammonia.

The quantitative results from the foregoing extractions and analyses are provided in Table 5, below.

TABLE 5

Compositions of the Starting Poplar and Fractions Resulting from Trialkylamine Extractions

| | | Experiment # | | | | | | | |
|---|---|---|---|---|---|---|---|---|---|
| | Fresh | 1 | | 2 | | 3 | | 4 | |
| Extractant | Poplar | Aq. NMe$_3$ | | Neat NEt$_3$ | | Aq. NEt$_3$ | | Aq. NEt$_3$ | |
| Poplar Mass, g | | 2.920 | | 3.213 | | 3.048 | | 10.121 | |
| Fraction | | Solids | Extract | Solids | Extract | Solids | Extract | Solids | Extract |
| Mass, g | | 2.130 | 0.800 | 2.740 | 0.513 | 2.313 | 0.878 | 7.764 | 4.688 |
| Wt % | | 73.00 | 27.40 | 85.30 | 16.00 | 75.90 | 28.80 | 76.70 | 46.30 |
| Glucan, % | 39.52 | 46.46 | 3.10 | 40.77 | 5.80 | 43.35 | 1.10 | | 3.69 |
| Xylan, % | 16.29 | 15.85 | 6.98 | 15.95 | 3.58 | 16.09 | 1.49 | | 3.12 |
| Lignin, % | 21.48 | 18.75 | 28.38 | 23.05 | 30.07 | 18.82 | 40.59 | | 22.96 |
| Others, % | 22.71 | 18.94 | 61.54 | 20.23 | 30.07 | 18.82 | 40.59 | | 22.96 |
| % C | 45.91 | 43.91 | 45.56 | 45.76 | 42.41 | 44.04 | 45.69 | | 51.83 |
| % H | 6.51 | 6.44 | 7.57 | 6.49 | 9.10 | 6.54 | 8.97 | | 7.86 |
| % N | 0.16 | 0.31 | 5.93 | 0.54 | 5.83 | 0.28 | 6.71 | | 4.19 |
| Extracted or remaining lignin content, % | | 63.67 | 37.03 | 93.60 | 22.86 | 68.01 | 55.68 | | 50.64 |
| Processed lignin, % of the starting | | 100.70 | | 116.47 | | 123.69 | | | |
| Processed glucan, % of the starting | | 87.90 | | 90.32 | | 84.04 | | | |
| Processed xylan, % of the starting | | 82.71 | | 87.01 | | 77.59 | | | |

The retention of ammonia, or trialkylamines, was consistent with significant nitrogen content in the extracts, as shown in Table 5, above. As also shown in Table 5, the total mass of the extract and residual biomass always exceeded the mass of the starting biomass. Without intending to be bound by theory, that mass defect was ascribed to the residual solvent trapped in the extracted viscous materials, which did not evaporate after a few days of drying.

The sum of the lignin contents in the residual biomass and the extracts systematically exceeded 100% for all samples as indicated in Table 5 (i.e., raw "Processed lignin, % of the starting"). Without intending to be bound by theory, it was believed this different was explained by the irreversible conversion of the biomass components into insoluble compounds, resulting from the interactions with 72% H$_2$SO$_4$. This belief was supported by the systematic reduction of the total carbohydrate content in the extracted and remaining biomass, as a fraction of the initial amount in the original biomass. Those ratios are shown in the rows "Processed glucan, % of the starting" and "Processed xylan, % of the starting." Still, the difference between lignin content in the extracts is evident in each sample.

Significantly, the lowest content of the extracted lignin (i.e., 22.86%) in the neat triethylamine demonstrated the importance of water for biomass delignification. Such low results, as well as the poor lignin extracting ability of an NEt$_3$-EtOH system, may be attributable to the polar transition state of the intermediates in the biomass hydrolytic depolymerization process. Such a polar state for the acetate hydrolysis reaction is illustrated below in Scheme 1. Without intending to be bound by theory, the highly polar solvent media, such as water, would stabilize such a polar state, accelerating the corresponding biomass deconstruction processes, and provide the reagent, that is, the water, itself. In contrast, a poorly polar media, such as triethylamine, would not stabilize such a polar state even in the presence of dissolved water molecules, so it is believed such a reaction would proceed much more slowly. The high solubility of the extracted products in water also suggests their polar nature, which would be stabilized by more polar solvents (e.g., water) used in their extraction.

Scheme 1

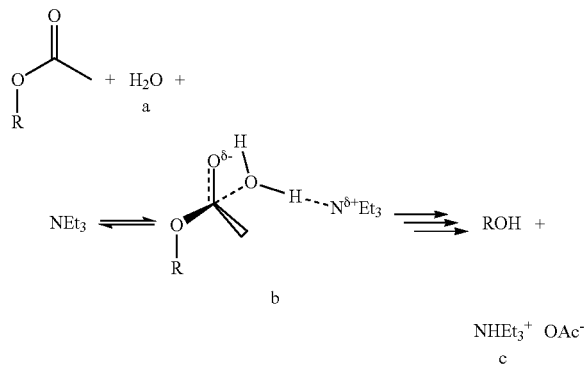

Extraction with aqueous trimethylamine gave the second lowest content of lignin (37.03%). Without intending to be bound by theory, it was believed that this low result was due to the release of trimethylamine from the heated pressurized vessel, as indicated by the smell during thermolysis. The release of trimethylamine was believed to have decreased the amount of trimethylamine in the extraction solution, thereby decreasing the amount of biomass it could extract via the base-promoted processes.

The highest yields of extracted lignin were obtained with aqueous triethylamine (i.e., samples 3 (55.68%) and sample 4 (50.64%)). In these samples, the extracted material consistently had low content of glucan and xylan—down to as low as 1.1% xylan in sample 3, from 39.52% of glucan and 16.29% xylan in the starting poplar. However, the content of those carbohydrates in the resulting material was close to that of the starting poplar. Without intending to be bound by theory, because the amount of the residual carbohydrates in the solid biomass is higher than that in the extracts, the carbohydrate-derived cations would have higher opportunity to condense to the residual lignin during acid treatment. Such acid-promoted condensation reactions of the carbohydrate molecules with each other and with residual lignin could lead to an inflated lignin content measurement in the starting poplar and lowered measured carbohydrate content, in which case the lignin extraction yields of about 50-55% could be underestimates.

Assuming that all of the nitrogen in the Sample 4 extract originated from triethylamine, the CHN content of that material, except for triethylamine, was re-calculated to give a composition of C=43.41%, H=4.79%, with the remainder of 51.80% (which mostly included O). This corresponded to a formula of $CH_{1.31}O_{0.90}$.

When the thermalized 2.2 mm chips were rinsed with aqueous triethylamine on a filter, the diffusion of the colored compounds from the inside of the chips to the surrounding solution took place within a few seconds. This was indicative that the need for such fine grinding of the biomass to achieve efficient delignification would not be necessary at an industrial scale, thereby saving energy. Furthermore, unlike fast pyrolysis, triethylamine extraction does not require careful biomass pre-drying, presenting an additional advantage.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compounds, compositions, articles, methods, and processes are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

What is claimed is:

1. A method of extracting lignin from a lignocellulosic biomass, the method comprising:
    admixing a lignocellulosic biomass with an aqueous extraction solution comprising water and a trialkylamine under temperature and pressure sufficient to extract lignin from the lignocellulosic biomass, thereby providing a biomass extraction mixture comprising the water, the trialkylamine, and the lignin solubilized therein, wherein the aqueous extraction solution contains not more than 0.2 wt % of any additional organic solvents other than one or more trialkylamines; and
    removing the trialkylamine from the biomass extraction mixture, thereby forming a solubilized lignin extract;
    wherein the trialkylamine has a structure of formula (I) and is present in the aqueous extraction solution in an amount ranging from about 20 wt % to about 80 wt %, based on the total weight of the aqueous extraction solution:

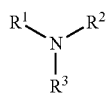

wherein each of $R^1$, $R^2$, and $R^3$ is independently $C_{1-6}$ alkyl.

2. The method of claim 1, wherein removing the trialkylamine from the biomass extraction mixture comprises performing one or more of solvent evaporation and distillation.

3. The method of claim 1, wherein each of $R^1$, $R^2$, and $R^3$ is independently methyl, ethyl, propyl, or isopropyl.

4. The method of claim 1, wherein the trialkylamine is selected from the group consisting of trimethylamine, triethylamine, dimethylethylamine, tripropylamine, and combinations thereof.

5. The method of claim 1, wherein the water is present in the aqueous extraction solution in an amount ranging from about 20 wt % to about 99 wt %, based on the total weight of the aqueous extraction solution.

6. The method of claim 1, comprising performing the admixing at a temperature in a range from about 100° C. to about 200° C.

7. The method of claim 1, comprising performing the admixing in a pressurized vessel.

8. The method of claim 1, comprising performing the admixing for up to about 20 hours.

9. The method of claim 1, wherein the lignin is present in the lignin extract in an amount ranging from about 20 wt % to about 60 wt %, based on the total weight of the lignin extract.

10. The method of claim 1, wherein the lignin extract is substantially free of the trialkylamine.

11. The method of claim 1, wherein the lignin extract comprises at least about 50% of the lignin initially present in the lignocellulosic biomass.

12. The method of claim 1, further comprising rinsing the lignin extract with ammonium hydroxide.

13. The method of claim 1, wherein:
the biomass extraction mixture comprises acetic acid; and
the method further comprises recovering and optionally further processing the acetic acid.

14. The method of claim 1, wherein the aqueous extraction solution is substantially free of ammonia.

15. The method of claim 1, wherein the aqueous extraction solution is substantially free of a sulfur component.

16. The method of claim 1, wherein the biomass extraction mixture is substantially free of additional organic solvents.

17. The method of claim 1, wherein the biomass extraction mixture is substantially free of ammonia.

18. The method of claim 1, wherein the biomass extraction mixture is substantially free of a sulfur component.

19. The method of claim 1, wherein the lignocellulosic biomass is a wood-based biomass.

20. The method of claim 1, wherein the lignocellulosic biomass comprises poplar.

21. The method of claim 1, further comprising admixing a second lignocellulosic biomass with a second aqueous extraction solution comprising water and the removed trialkylamine under temperature and pressure sufficient to extract lignin from the second lignocellulosic biomass, thereby providing a second biomass extraction mixture comprising the water, the removed trialkylamine, and the lignin.

22. The method of claim 1, further comprising:
separating extracted lignocellulosic biomass from the biomass extraction mixture.

23. The method of claim 1, comprising performing the method batchwise or continuously.

24. The method of claim 1, further comprising:
themolyzing the lignin extract to provide a carbon material.

25. A method for enzymatic hydrolysis of at least one of cellulose and hemicellulose, the method comprising:
providing a lignin extract and extracted lignocellulosic biomass formed by the method of claim 1, wherein the lignin extract and the extracted lignocellulosic biomass are substantially free from acetamide, and the extracted lignocellulosic biomass comprises at least one of cellulose and hemicellulose; and
treating the extracted lignocellulosic biomass with an enzyme.

26. The method of claim 1, wherein the aqueous extraction solution comprises:
from 20 wt % to 50 wt % water, and
from 50 wt % to 80 wt % the trialkylamine.

27. The method of claim 26, wherein:
the aqueous extraction solution comprises the trialkylamine and the water in a total amount of at least about 99.9 wt %, based on the total weight of the aqueous extraction solution.

28. The method of claim 26, wherein:
a weight ratio of (i) a combined amount of the trialkylamine and the water in the aqueous extraction solution relative to (ii) an amount of biomass in the biomass extraction mixture is at least 2.

29. A method of extracting lignin from a lignocellulosic biomass, the method comprising:
admixing a lignocellulosic biomass with an aqueous extraction solution comprising water and a trialkylamine at a temperature ranging from about 100° C. to about 200° C. and a sufficient pressure to extract lignin from the lignocellulosic biomass, thereby providing a biomass extraction mixture comprising the water, the trialkylamine, and the lignin solubilized therein, wherein the aqueous extraction solution contains not more than 0.2 wt % of any additional organic solvents other than one or more trialkylamines, and
removing the trialkylamine from the biomass extraction mixture, thereby forming a solubilized lignin extract, wherein the aqueous extraction solution comprises:
from about 20 wt % to about 80 wt % water, and
from about 20 wt % to about 80 wt % trialkylamine, wherein the trialkylamine is selected from the group consisting of trimethylamine, triethylamine, tripropylamine, dimethylethylamine, and any combination thereof.

* * * * *